US006567792B1

(12) United States Patent
Arnold

(10) Patent No.: US 6,567,792 B1
(45) Date of Patent: May 20, 2003

(54) METHOD OF DATA COLLECTION FOR FISHERIES MANAGEMENT

(75) Inventor: Richard C. Arnold, Lamoine, ME (US)

(73) Assignee: Thristle Marine, LLC, Ellsworth, ME (US)

( * ) Notice: Subject to any disclaimer, the term of this patent is extended or adjusted under 35 U.S.C. 154(b) by 0 days.

(21) Appl. No.: 09/332,653

(22) Filed: Jun. 14, 1999

Related U.S. Application Data

(60) Provisional application No. 60/122,545, filed on Mar. 2, 1999.

(51) Int. Cl.[7] .............................................. G06F 17/60
(52) U.S. Cl. ......................... 705/50; 701/219; 43/54.1; 705/1
(58) Field of Search ................................ 705/28, 50, 1, 705/30; 701/219; 43/54.1; 206/315.11, 569; 346/107.2, 145, 9; 177/245

(56) References Cited

U.S. PATENT DOCUMENTS

| 4,753,031 A | * | 6/1988 | Owen | 43/54.1 |
| 4,839,675 A | * | 6/1989 | Owen | 354/76 |
| 5,241,466 A | * | 8/1993 | Perry et al. | 364/401 |
| 5,987,377 A | * | 11/1999 | Westerlage et al. | 701/204 |

FOREIGN PATENT DOCUMENTS

| WO | WO 85/01794 | * 10/1984 |
| WO | WO 97/04334 | 7/1996 |

OTHER PUBLICATIONS

The western Pacific Fishery Information network; hamm, david C.; Spring 1993, v55, n2, p102 (7).*
XP–000952241—"Developing Gis Data Layers for Estuarine Resource Management" William H. Jefferson, et al for Marine Biology and Coastal Research, University of South Carolina, Columbia. SC 29208.

XP–002150771—"A Digital Data Logging System for Acoustic Studies of Fish Stocks," by I. Hampton, et al, from Instrumentation In Oceanography, 1975 London, UK, IERE, UK.

* cited by examiner

Primary Examiner—Pierre E. Elisca
(74) Attorney, Agent, or Firm—Patricia M. Mathers; Thomas L. Bohan

(57) ABSTRACT

A method of gathering, analyzing, and reporting data about commercial fish stocks and fisheries. Under this method, individual commercial fishermen use a device specific to the type of fishing being done to record the number of fish brought aboard, the number kept or released, the reason for release, the date, time, and location of the catch, and the fishery conditions, such as water temperature, depth, and salinity at the time that fish are brought aboard the fishing vessel. The individual fishermen transfer the data, typically via telephone link, to a central data repository, or to a receiving station when the data is transferred to the central data repository at a later time. The data is encrypted during transfer and placed in fisherman files, each fisherman having his own, restricted-access file. Data from all individual fishermen, as well as from other sources, are placed in a composite data pool to be used as source data for a general fishery database on fishstocks and fisheries. This data can be stripped of data that would identify a particular fisherman as the source, to preserve fishing secrets. Confidential reports can be generated from a fisherman file and delivered to the individual fisherman who is the source of that data. Reports for regulatory agencies can also be generated from the data in the fisherman file. The fishery database provides a unit for regulatory agencies, fisheries managers, and fish research institutions to analyze, monitor, and report on the development of fishstocks and fisheries.

26 Claims, 7 Drawing Sheets

METHOD OF DATA COLLECTION FOR FISHERIES MANAGEMENT

This application claims the benefit of Provisional Application No. 60/122,545 filed Mar. 2, 1999

BACKGROUND OF THE INVENTION

1. Field of Invention

The present invention relates to the field of fishing. More particularly, the present invention relates to the field of commercial fishing and commercial fisheries management. More particularly still, the present invention relates to gathering, recording, analyzing, and reporting of data in the field of commercial fishing and commercial fisheries management.

2. Prior Art

Since ancient times, the pursuit of fishing has paid no heed to "the one that got away," except in tavern tales and sea-faring novels. This traditional mindset persists today. Among fishermen, from solitary anglers to operators of commercial fishing vessels, the "catch"—those fish that are actually brought back—is the only thing that is ever accurately identified, sorted, counted, and recorded. Information is rarely kept, and more rarely reported, about fish that had been trapped, hooked, or netted, and then thrown back for being the wrong size, the wrong species, or in the wrong condition (such as egg-bearing females of certain species). As a result, information that could be noted by individual fishermen, and that might even be of great benefit to those same individual fishermen, as well as to the fishing industry as a whole, is customarily lost simply as a matter of standard practice. In general, there is currently no reliable "catch and release data" relative to the fishing industry from fishermen and no currently practical means of obtaining such data.

Further, information about where fish are caught, whether they are kept or released, is also traditionally held close. The location of an angler's fishing hole and a fishing boat captain's fishing ground have been given the status of trade secrets since time immemorial.

There were and are good reasons, grounded in competition for sport and for commercial purposes, for keeping secrets. From these rational concerns the traditions and standard practices of fishing have evolved. To a large extent, also, there have been practical reasons for fishermen not to take accurate note of details—in particular catch, release, and location data—having no immediate importance to them, while they are in the heat of battle with the sea, the weather, the wildlife, and the passage of time. Although some fishermen may write down some of this information, such notes are almost always kept in secret. The result of traditional secretiveness and standard practice among fishermen, however, is the loss of accurate information about fish stocks and the condition of fishing grounds. This remains so even in the present period, a time of dwindling stocks and endangered fishing grounds, when such information, if kept and used by an individual fisherman, could be used to increase the efficiency and profitability of that fisherman's own commercial enterprise. On a larger scale, the aggregation of such information is of vital importance to the effective management of fisheries and to the health and the very survival of the fishing industry. Nevertheless, the tradition of secrecy coupled with a mistrust of the ability of government agencies to manage fisheries, keeps such information from being effectively gathered. Furthermore, this mistrust of government regulation and management manifests itself in the reticence among fishermen to cooperate with the information-gathering efforts of government regulators and their agencies—such as regulation-mandated random spot-checks of individual fishing operations.

Currently, information is general and uncertain about fish stocks and the condition of fishing grounds as a whole, about the health and abundance (or lack of it) of the many commercial varieties, of their location in abundance or deficit, of their migration patterns, and of their breeding patterns, seasons, and efficiencies. The gathering of most of this vital information currently falls almost exclusively to a few public inspectors and private researchers. In states that support and control the fishing industry, state governments attempt to provide, within budgetary constraints, the inspection of and reporting on fishing operations and on the condition of fishing grounds and of fish stocks through variously named "departments of marine resources." From time to time, this information may be augmented by the efforts of non-governmental fishing organizations—e.g., the FAO, which is part of the United Nations—and by the necessarily narrow interests of academic or institutional researchers. Currently, the limited data collected by these means, and the analysis of such data, form the sole basis of governmental regulation of the fishing industry. The trouble is that, relative to the size of the industry and the volume of information necessary to form the basis of valid judgments, the number of persons collecting such information is small, making the accumulation of a statistically significant volume of fishery-related data difficult or, arguably, impossible.

For example, the State of Maine currently depends on part-time volunteers, a few paid inspectors (primarily seeing catches as they are brought to port), and academic researchers for the gathering of information relative to lobster fishing, an industry carried on in Maine by as many as 6,000 fishing vessels operating over thousands of square miles in the Gulf of Maine. The fact that vessels are not generally available to these few information gatherers for their own use limits their effectiveness. Thus, these volunteers—and occasionally government-employed inspectors—usually operate aboard the vessels of commercial fishermen who, because of longstanding and growing mistrust of inspectors and regulators, may offer less than full cooperation and candor, and may even give misleading responses to inquiries. Further, even when such an information-gathering effort is augmented by that of institutional researchers, the additional information that can be applied specifically to the analysis of particular fish stocks in particular fishing grounds is meager because the focus of the research by these institutions often does not provide information that is useful for the commercial fishing industry. The resulting paucity of data is a contributing factor in the development of guidelines and policies that are generally not accepted by fishermen.

What is needed is a practical method for gathering fishery-industry-related data. What is further needed is such a method that is employable by an individual commercial fisherman at sea. What is yet further needed is such a method that will gather data from many individual fishermen, combine the data to a single fishery-related database, and generate reports useful to the commercial fishing industry. What is still yet further needed is such a method that will hold confidential certain data provided by an individual fisherman and provide the individual fisherman with confidential reports useful to the fisherman's enterprise.

SUMMARY OF THE INVENTION

It is therefore an object of the present invention to provide a practical method for gathering fishery-industry-related data. It is a further object of the present invention to provide such a method that is employable by an individual commercial fisherman at sea. It is a yet further object to provide such a method that will gather data from many individual fishermen, combine the data to a single fishery-industry-related database, and generate reports useful to the commercial fishing industry. It is a still yet further object to provide such a method that will hold confidential certain data provided by an individual fisherman and to provide the individual fisherman with confidential reports useful to the fisherman's enterprise.

The individual fisherman making use of the method of the present invention brings a data-collection-and-storage-device with him on-board, generally on his commercial fishing vessel. The data-collection-and-storage-device can be of any type that is suitable for entering and storing data collected by fishermen, and can include general data input and storage devices and voice-recognition input devices that are direct-wired to or connected via radio transmission to a data storage device. Preferably, though, the data collector is individualized in a way set out below. Although just a simple counting and storage device of a type easily designed by those familiar with the art, the datallection-and-storage-device is designed to facilitate the entry of the data that is important to the particular fishing industry in which it is to be used. In addition to accepting and storing data about fish caught—including those subsequently released—as nets, lines, traps, and the like, are hauled in, the data-collection-and-storage-device associates each set of catch-and-release data in its memory with the location of the vessel at the date and time the data was entered. The location of the vessel is best defined by a longitude/latitude specification. A number of conventional navigational systems and the like that provide location in terms of longitude and latitude can be tied into the data collector for this purpose. The artificial-earth-satellite-based Global Positioning System (GPS) is the system in general use at present that lends itself most conveniently to this function. Most fishing vessels are already equipped with GPS instruments, and it is a straightforward matter to tie the output of such instruments to the data collector of the present invention for the stated purpose. LORAN may also be used to determine vessel location, as long as the vessel is close enough to land to receive a signal.

The data-collection-and-storage-device is initialized at the first power-up, meaning that information is entered relating to the fisherman using the device, the particular vessel, and the type of fishing engaged in. This information is maintained in the device until it is intentionally changed by the user of the device. During a fishing excursion, the data-collection-and-storage-device is used to record all catch-and-release data. In particular, the device records each catch and each release and the reason for a release, such as the catch is the wrong size, the wrong species, and/or in the wrong condition—e.g., egg-bearing females, where such restrictions apply. In the Preferred Embodiment, to facilitate recording the releases, the data-collection-and-storage-device is especially adapted to, if not specially fabricated for, each particular kind of fishing and for each particular target specie or set of species. Additional data may also be recorded, depending upon the opportunities available in a particular commercial fishing operation. Additional data that may be automatically recorded by or manually entered into the device include water temperature, water depth, weather conditions, water salinity, water currents, and tide phase. It is, of course, possible to use general data input and storage devices and the appropriate software to adapt the data collection means so as to facilitate data input for the fishing industry or a particular type of fishing activity. Thus, it is understood that it is within the scope of the present invention to use any type of data-collection-and-storage-device that is suitable for data collection according to the method of the present invention.

At the end of a fishing excursion, the fisherman transfers the contents of the data-collection-and-storage-device to a central data repository, either directly or via a receiving station. The receiving station is a computer that holds the data for transfer to the central data repository at a later time and, for the fisherman, the procedure of transferring data is the same, whether to a receiving station or to the central data repository. In practical terms, the central data repository is a computer incorporating software applications for the manipulation and analysis of data and the production of desired reports. It also incorporates provisions for data security. The method of transfer, whether to a receiving station or the central data repository, is usually by telephone line and is such that the proprietary nature of each data contribution can be respected and the confidentiality of the data source (the identity of the individual fisherman) ensured. To maintain confidentiality, the data can be encrypted during the transfer and the data records related to each particular source (fisherman) can be stored in individually secure files. The data source may also remain encrypted in the central data repository.

Certain data can be deemed to be proprietary to the individual fisherman—such as location of catch and sales revenues—and the analysis of that data as it accumulates over time, and be made available only to the individual fisherman who was the source of the data. The particular reports that can be returned periodically to each fisherman about that fisherman's catches can also include information needed for reporting to regulatory agencies. Indeed, the mandated reports themselves may be directly generated by the central data repository, and, by agreement, even filed on behalf of the fisherman. A variety of confidential reports may be generated for the fisherman, such as: reports for business accounting; accumulated historical reports about the individual's customary fishing grounds related to such factors as time, place, and the types and/or species of fish found; and analyses of the efficiency of traps, nets, and lines, related to the bait used, the location, and the season. Further, these reports may be provided as textual reports, graphs, or mapping data, or in any format useful to a particular fisherman. The value of such reports—in providing reports required by regulatory agencies as well as valuable information from which to hone a more efficient and profitable enterprise—furnishes sufficient motivation for individual fishermen to act as data sources that feed an aggregate fishery-related database.

Fishery-related information is that information that is placed in an aggregation data pool in the central data repository. Such information can be stripped of its source identification so that it anonymously combines all such data gathered from all sources about a wide variety of fishing methods and fish species, if it necessary to hold certain fisherman data confidential. In this aggregation data pool, data provided by fishermen may also be combined with data contributed by regulatory agencies and research institutions. The resulting data pool is on so large a scale that individual fishermen data, including their favorite fishing grounds, are not identifiable. In any event, the aggregate of data so collected is large enough, and of sufficient detail, to form statistically significant data samples on which to base public policy and industry practices related to the regulation, management, and use of the fisheries as a whole. The method of the present invention thus envisions the use of this data pool for both routine and custom generation of reports, in formats and contents appropriate to the needs of those agencies and institutions who seek to manage fisheries and set commercial fishing policies and practices. In this way, the present invention allows those individual fisherman directly affected by fishing regulations to participate directly in providing the informational basis of those regulations.

Various agencies and institutions have access to the general fishery-related data pool, although it is possible that an authorized agency would have sole access to the data and would manage and analyze the data and prepare reports for the regulatory agencies, the institutions, and the individual fishermen. It is also possible that, rather than maintaining confidential accounts for the individual fishermen, the fishermen would relinquish their claim to confidentiality and release all data, i.e. data not stripped of source identification, to the general fishery-related data pool for regulatory purposes.

Briefly, then, the method of the present invention includes the following steps: An individual fisherman embarking upon a fishing excursion brings on-board a data-collection-and-storage-device that has been initialized with data identifying the fisherman and the vessel. During the excursion, concurrent with each catch being taken aboard, the fisherman enters into the data-collection-and-storage-device data about the catch, including the number of each type or variety of fish kept, the number of each type or variety of fish released, and the reason for the release. The location of the catch, the time and date of the catch are attached to the data by the data-collection-and-storage-device. Other relevant physical and environmental conditions during the catch can be manually entered by the fisherman or automatically recorded by the data-collection-and-storage-device. The record of each catch is stored in the data-collection-and-storage-device and the collection of stored data is held there until the fisherman transfers the data to a receiving station or a central data repository. This is typically done after the fisherman returns to shore, via a telephone link, but may also be done from any location, provided the means to link to the receiving station or central data repository are available. The fisherman's data is encrypted during the transfer to ensure confidentiality. In the Preferred Embodiment, two effective copies of the data are made and maintained in the central data repository: a fisherman copy and an agency copy. The fisherman copy is placed into and held in an individually secure fisherman account that contains only the specific records deposited by an individually identified fisherman. Further, the means of identifying the owner of such individually secure accounts is itself encoded, and not directly accessible, in the data records. The agency copy is stripped of its fisherman-identifying component and stored in a logically or physically separate area of the central data repository. This "stripped" data is integrated into a composite, fishery-wide database containing all of the fishery-related data for all of the individual data contributions. In the secure portion of the central data repository, data in each confidentially-maintained account is separately manipulated and analyzed, and reports are generated that are returned exclusively to the fisherman who contributed the data. These reports include reports required by regulatory agencies, business and accounting reports, and reports related to the efficiency of the fisherman's fishing operations and methods. In the composite, fishery-wide database, where the security of specific records is still generally maintained, the combined, accumulated data from all sources is separately manipulated and analyzed, and reports of aggregate raw data, as well as analysis of the data, are made available to regulatory agencies and public or private institutions engaged or interested in the regulation and management of fisheries. In alternative embodiments of the present invention, the individual fisherman relinquishes a claim to confidentiality and releases individual fisherman data directly into the aggregation, fishery-wide database.

While the Preferred Embodiment below describes an application of the method of the present invention to one type of commercial fishing, the generality of the method should not be overlooked. Also, where a particular device suited to that one type of commercial fishing is described in the Preferred Embodiment, other analogous devices better suited to others types of commercial fishing are not dispensed with.

PREFERRED EMBODIMENT OF THE INVENTION

The Preferred Embodiment of the present invention relates to lobster fishing. Just as almost all fishing is now strictly regulated, lobstering along the northeast coast of the United States is currently subject to a set of regulatory restrictions limiting the times and places of fishing and, in particular, specifying by size, type, and condition the lobster that may and may not be harvested. Although the rules vary with jurisdiction, they generally include restrictions on lobsters that are too small to be harvested, lobsters that are too large to be harvested, and on females bearing eggs or identified as having borne eggs—referred to as "v-notched females." (Current regulations mandate that lobstermen cut a v-notch into the tail of any egg-bearing female lobster caught and then release it, thenceforth identifying that lobster as a proven breeder.)

Figure 1:
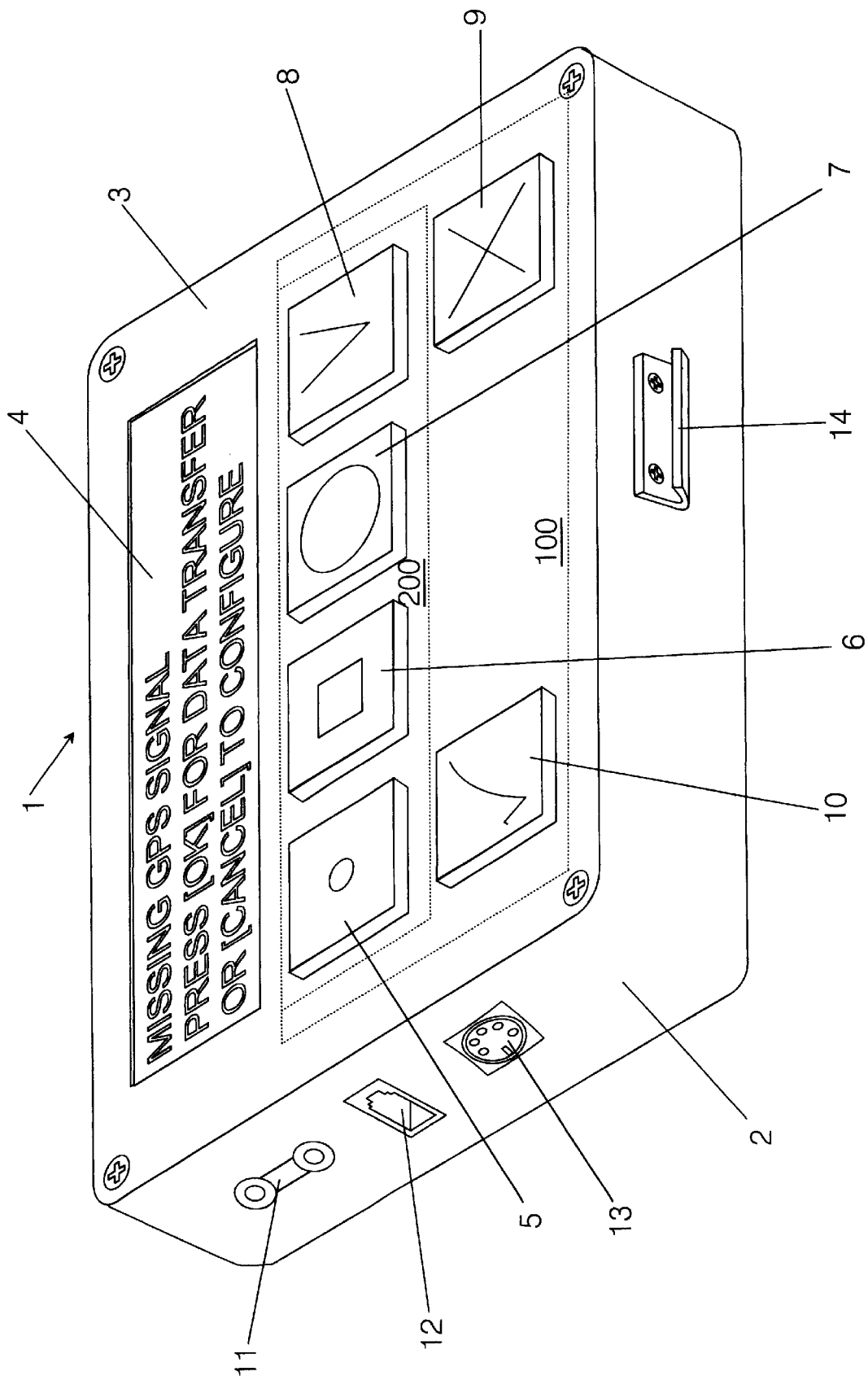
FIG. 1 is a drawing the data-collection-and-storage-device showing the operating buttons, the display, the connectors used for connecting to external devices and systems, and the mounting-clip hasp.

Setting out to harvest the catch of his traps, the lobsterman brings a data-collection-and-storage-device designed specifically for lobstering to facilitate data entry and to keep the device as simple as possible (see FIG. 1). The components of the data-collection-and-storage-device 1 are housed in a rugged, weather-sealed case 2. The data-collection-and-storage-device 1 may have an affixable cover or carrying case. The working surface 3 of the data-collection-andstorage-device 1 contains a display area 4, typically a liquid crystal display (LCD), and a set of six buttons 100, including a set of four counting buttons 200 grouped in a row, a count reset button 9, and a data-entry button 10. The four counting buttons 200 include an undersize counter button 5, a legal-size counter button 6, an oversize counter button 7, and a v-notched-female counter button 8, each of the buttons being marked to identify its function. (Note that, although the primary function of these buttons is to count the number of lobster caught, these buttons also have functions unrelated to these markings, depending on the operating mode of the data-collection-and-storage-device 1.) As a practical matter, each of the set of six buttons 100 is large so that it can be manipulated by gloved hands under unstable conditions at sea. In addition, all of the set of six buttons 100 and the display area 4 are lighted in order to be read under low-light conditions. In an alternative embodiment, the data-collection-and-storage-device 1 would also include a number keypad (not shown).

In the Preferred Embodiment, as shown in FIG. 1, three connectors are located on one of the exterior lateral surfaces of the data-collection-and-storage-device 1: a power connector 11, a telephone connector 12 (typically, a standard telephone jack), and a GPS connector 13 (typically, a multi-pin D-type connector). In an alternative embodiment a LORAN navigational system, rather than a GPS system, can be used to provide the necessary navigational data. In that case, connector 13 can be used to connect the data-collection-and-storage device 1 to a LORAN system. Additional connectors may be provided for connection to, and receiving input from, other on-board sensing devices such as water depth and water temperature sensors. Likewise, additional buttons may be provided to allow manual input of such additional data. The data-collection-and-storage-device 1 also has a pair of mounting-clip hasps 14 mounted on opposite sides of the rugged, weather-sealed case 2 with which to secure the data-collection-and-storage-device 1 to a mounting bracket 58 (FIG. 5) that is attached to the boat structure so as to prevent loss of the data-collection-and-storage device 1 in rough seas.

Figure 2:
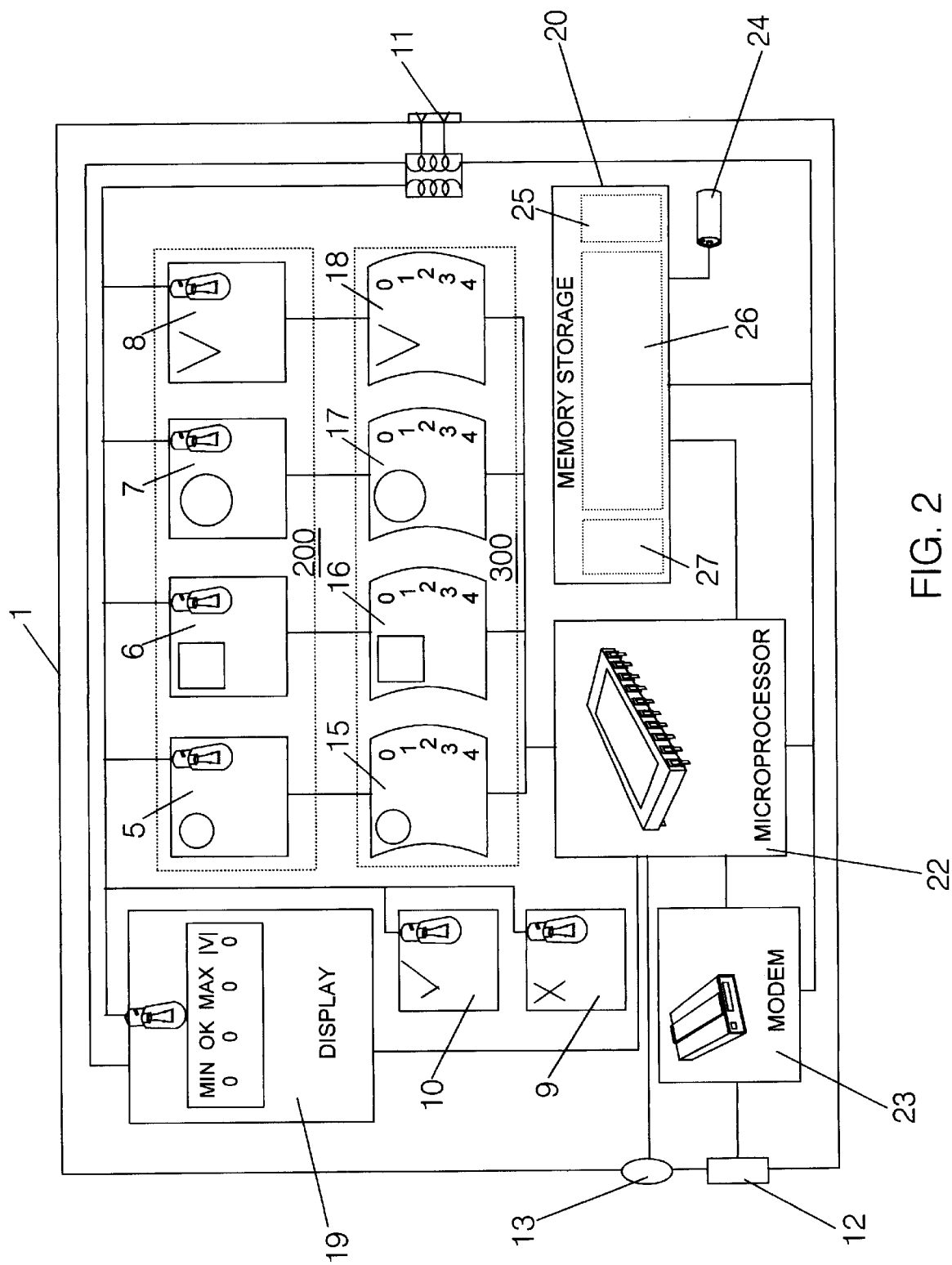
FIG. 2 is a block diagram of the electrical structure of the data-collection-and-storage-device.

As is shown schematically in FIG. 2, in the Preferred Embodiment four category buttons 200 are electrically connected internally to inputs of four counters 300. An undersize category button 5 is connected to an undersize counter 15, a legal-size category button 6 to a legal-size counter 16, an oversize category button 7 to an oversize counter 17, and a v-notched-female category button 8 to a v-notched-female counter 18. Each time one of the four category buttons 200 is pressed, its associated counter is incremented by one. In an alternative embodiment, before pressing one of the category buttons a total count for a category can be entered via a number keypad that is electrically connected to the four counters 300. In this case, the counter associated with the category button that is pressed is incremented by the count entered on the number keypad.

Figure 4:
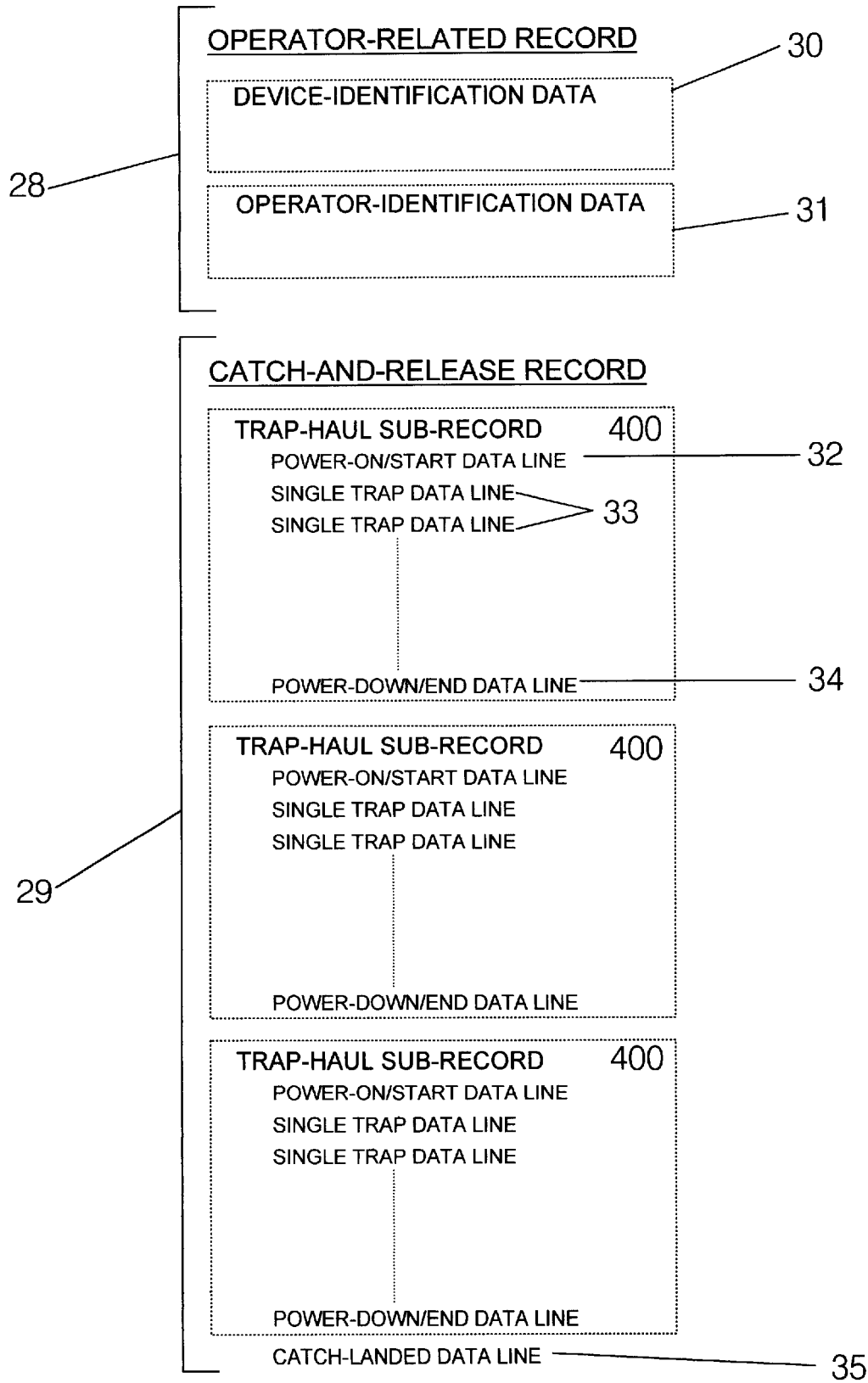
FIG. 4 is a diagram of the data structure of records collected by operation of the data-collection-and-storage-device and stored in its memory.

Referring to FIG. 1 and FIG. 2, it can be seen that the four counters 300 are electrically connected to a microprocessor 22, which is in turn connected to a display component 19—a display area 4 of which is visible from the exterior of the data-collection-and-storage-device 1 on its working surface 3. The microprocessor 22 uses the display component 19 to display to the operator of the data-collection-and-storage-device 1 the current contents of the four counters 300, as well as status messages, operator-instruction messages, and operator-input prompts, depending on the operational mode of the data-collection-and-storage-device 1. In the Preferred Embodiment, the microprocessor 22 is also connected to the GPS connector 13, to the data-entry button 10, to the count-reset button 9, to the modem 23, and to a data-storage component 20, all as shown in FIG. 2. The data storage component 20 is capable of storing a number of trap-haul sub-records 400 that are contained in a catch-and-release record 29, as is shown in FIG. 4. The operating instructions for the microprocessor 22 are contained in replaceable or electrically updatable firmware.

Referring again to FIG. 2, in the Preferred Embodiment the power connector 11 is electrically connected to the four counters 300, the set of six buttons 100, the display component 19, the microprocessor 22, and the data-storage component 20, to distribute power from an external source for the operation of these components. If a number keypad is incorporated into the data-collection-and-storage-device 1, it will also be connected to the power connector 11. In addition, the internal battery 24 is electrically connected to the data-storage component 20 to supply power sufficient to maintain the stored data in memory while data-collection-and-storage-device 1 is not connected to an external power source. The memory of the data-storage component 20 is divided into three areas and is shown in FIG. 2: an operator-related record area 25, in which, although able to be updated, the data is maintained effectively for the life of the data-collection-and-storage-device 1, a catch-record area 26, in which the data of the catch-and-release record 29 is stored (see FIG. 4), and a data buffer 27 which records data periodically sent via the connection to the on-board GPS unit 51 (see FIG. 5). In an alternative embodiment, the data buffer 27 can record data sent periodically via a connection to a LORAN system.

GPS systems found on board fishing vessels commonly use the NMEA-0183 data communications standard. Under this standard, the GPS system determines and sends a time-stamped location every few seconds (typically 1 to 5 seconds). The time stamp gives the date and time of the message in Universal Time. When, according to the Preferred Embodiment, the data-collection-and-storage-device 1 is connected to a GPS system, the GPS data buffer 27 will always contain the last time-stamped location data sent by the GPS system.

Figure 3:
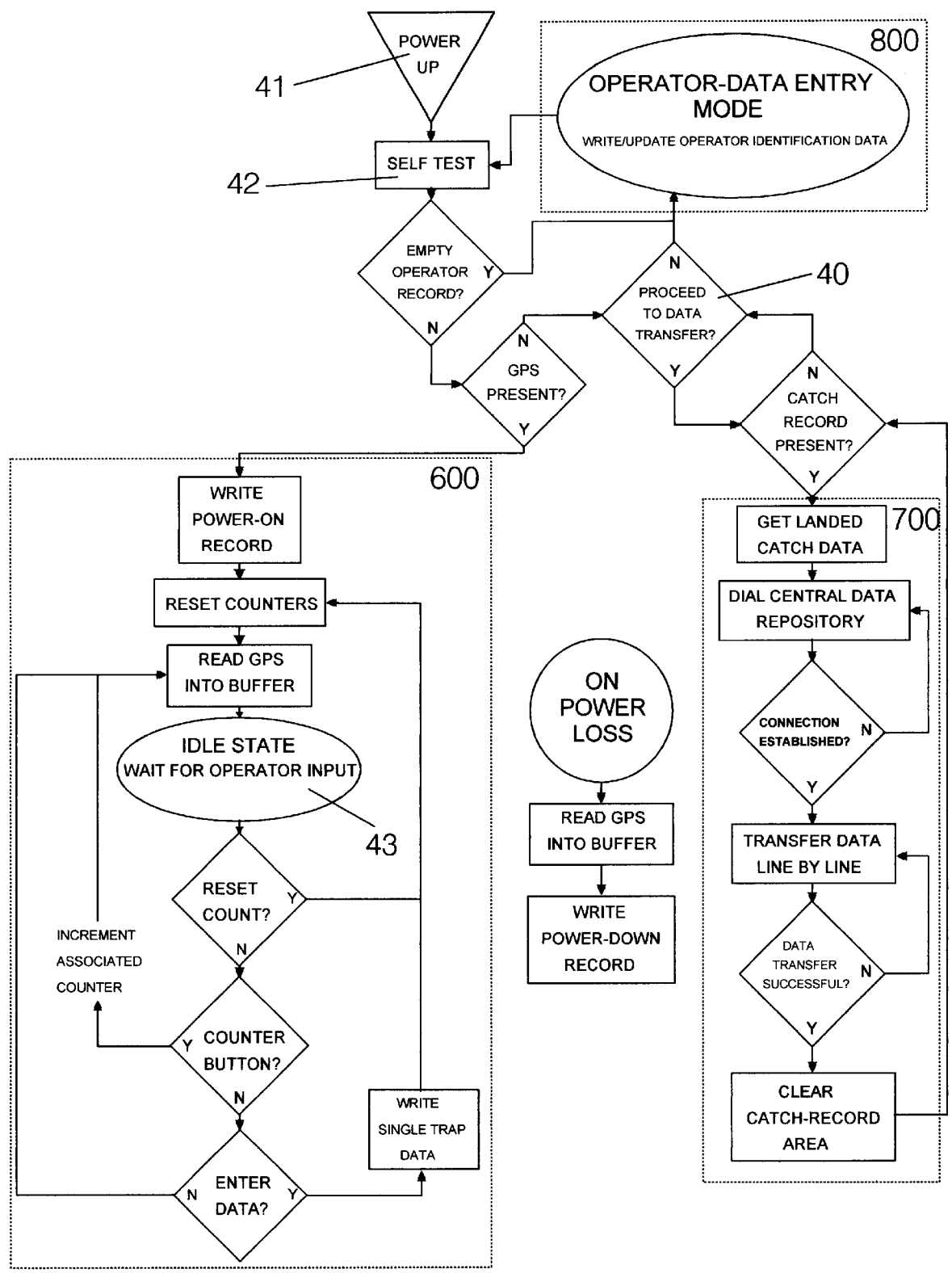
FIG. 3 is a flow chart showing the logical operation of the microprocessor-controlled operating system contained in software or firmware of the data-collection-and-storage-device.

FIG. 3 shows the logical operation of the data-collection-and-storage-device 1 according to the operating instructions of the microprocessor 22. FIG. 4 shows the data structure of the data stored in the data storage component 20. As seen in FIG. 3, the data-collection-and-storage-device 1 has three operational modes that may be either automatically selected or manually selected. On the first power-up 41 of the data-collection-and-storage-device 1, the self-test 42 determines that the operator-identification data 31 (FIG. 4) are missing from an operator-related record 28 and automatically selects the operator-data entry mode 800. The operator-related record 28 is made up of device-identification data 30, which are stored when the data-collection-and-storage-device 1 is manufactured, and operator-identification data 31. In the initial operator-data entry mode 800, the operator enters operator/boat identification data and the telephone number that will be used by the modem 23 (FIG. 2) to connect to the central data repository 500 (see FIG. 6 and FIG. 7), as well as fish species data and a local time off-set from Universal Time (formerly GMT). The initializing data, once entered, is the default information and the device will not prompt for entry of this data unless a specific command to change this data is entered. Operator input is accomplished, as noted above, using the set of six buttons 100 shown in FIG. 1) according to written instructions and by following messages and prompts displayed on the display area 4 (FIG. 1) of the display component 19 (FIG. 2).

When the self-test 42 determines during power up 41 that the data-collection-and-storage-device 1 of the Preferred Embodiment has no connection to the on-board GPS unit 51 (FIG. 5)—or, in an alternative embodiment, has no connection to a LORAN system—the operator has the option of entering the operator-data entry mode 800 and updating the operator-related record 28, or of proceeding to the data transfer mode 700 (FIG. 3). The data transfer mode 700 is described below.

Figure 5:
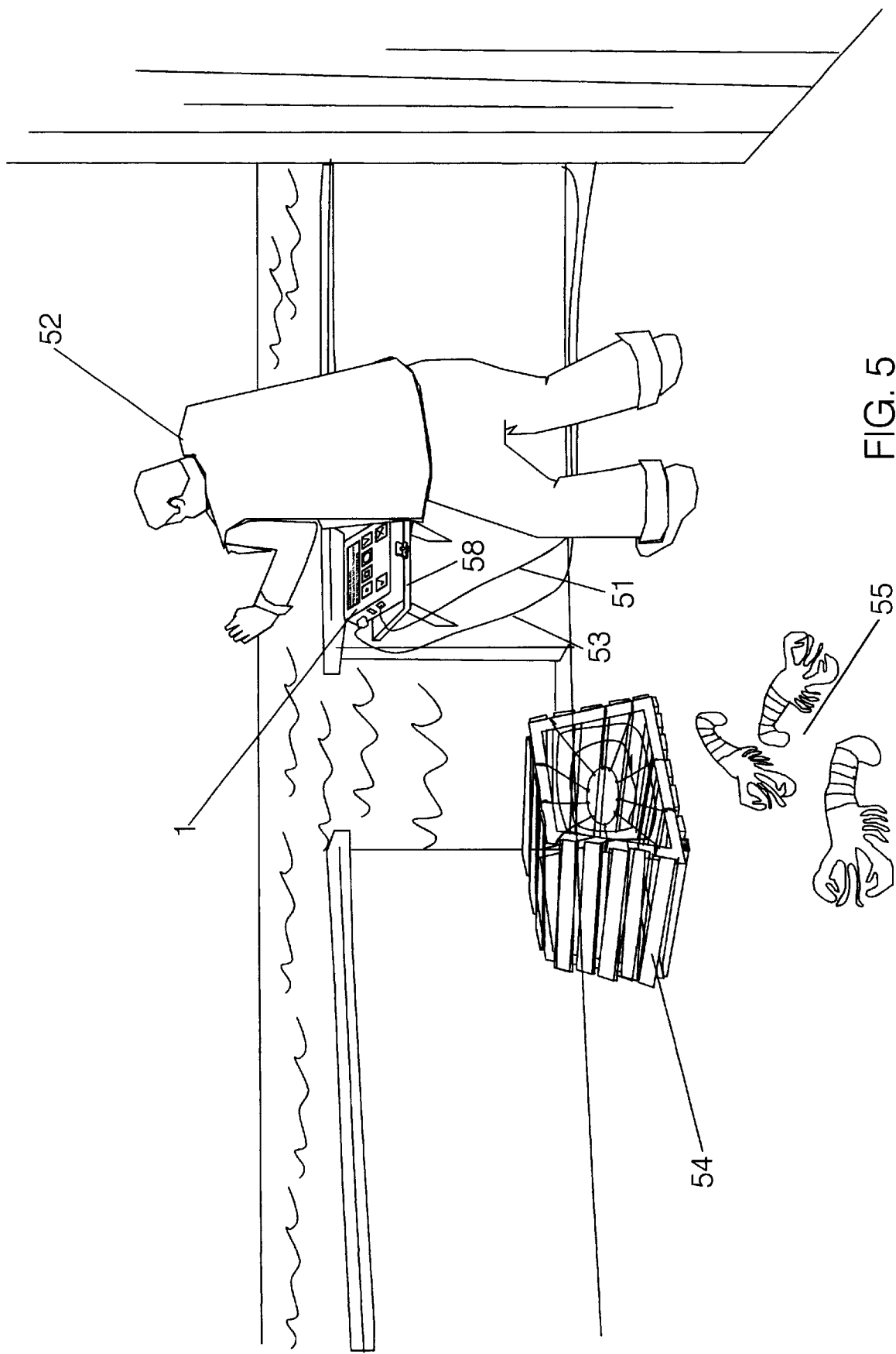
FIG. 5 is a drawing showing a lobsterman operating the data storage and collection device to collect and store catch data from his lobster traps.

In order to record catch data, a lobsterman 52 must connect the data-collection-and-storage-device 1 to the vessel's power-supply 53 and to the on-board GPS unit 51, as shown in FIG. 5. In an alternative embodiment, the data-collection-and-storage device 1 must be connected to a LORAN system. In the Preferred Embodiment, the data-collection-and-storage-device 1 is preferably installed in that part of the vessel where the traps 54 are hauled aboard. A mounting bracket 58 can be been attached to the boat structure in a convenient area, as illustrated in FIG. 5, and the data-collection-and-storage device 1 secured to the mounting bracket 58 by means of mounting clips 59 (not shown) that are mechanically attached to the mounting bracket 58. The data-collection-and-storage device 1 can be seated in the mounting bracket 58 by means of mounting-clip hasps 14 (shown in FIG. 1). As each trap 54 is hauled aboard, the lobsterman 52 observes the catch 55 held in the trap 54, enters data about the catch 55 in that trap 54 into the data-collection-and-storage-device 1, disposes of the catch 55 (each lobster either into the vessel's hold or back into the sea) and the trap 54 (which is usually re-baited and re-deployed), and hauls the next trap 54. This procedure is repeated until all traps in a particular location are hauled. In the Preferred Embodiment, the data-collection-and-storage-device 1 will also prompt the lobsterman 52 at every nth trap for additional data, such as, carapace length, weight, sex, and/or condition (for example, one or two claws).

Referring now to the flow chart shown in FIG. 3 and the data record structure shown in FIG. 4, the Preferred Embodiment of the data-collection-and-storage-device 1 performs a self-test 42 upon power-up. If the data-collection-and-storage-device 1 determines during this self-test 42 that the data-collection-and-storage-device 1 is connected to the on-board GPS unit 51, it automatically selects catch-data entry mode 600. Each time the data-collection-and-storage-device 1 is powered up in the catch-data entry mode 600, the microprocessor 22 reads the contents (date, time, and location) of the GPS data buffer 27 (shown in FIG. 1) and writes this data into the power-on/start data line 32 as the first line of the trap-haul sub-record 400. The contents of the four counters 300 are then reset to zero, the zero content of each of the four counters 300 is displayed on the display area 4 of the display component 19, and the microprocessor 22 enters the idle state 43 and waits for data input or disconnection.

As the lobsterman 52 empties the trap 54, he enters the content of the catch 55 by pressing the one of the four category buttons 200 once for each one of the type of lobster associated with one of the four category buttons 200. In the Preferred Embodiment, when the lobsterman 52 presses one of the four category buttons 200 once, the content of the one of the four counters 300 connected to that button is incremented by one, and the updated content of the four counters 300 is displayed on the display area 4 of the display component 19. Thus, if the lobsterman 52 finds a trap 54 to contain 2 undersize lobster, 1 legal-size lobster, and 1 v-notched-female lobster, the lobsterman 52 presses the undersize category button 5 twice, the legal-size category button 6 once, and the v-notched-female category button 8 once; the resulting contents of the undersize counter 15, the legal-size counter 16, the oversize counter 17, and the v-notched-female counter 18 are 2, 1, 0, and 1, respectively; and these respective counts are displayed on the display area 4 of the display component 19. Having emptied the trap 54 and entered the counts of the catch 55 into the data-collection-and-storage-device 1, the lobsterman 52 presses the data entry button 10 to initiate storage of the data. As an alternative method of entering a count, particularly useful when dealing with a large catch, the lobsterman 52 can sort the lobsters according to the categories that match those of the category buttons 200, enter the count for each category on the number keypad, press the corresponding category button, and then press the data entry button 10 after the counts for all categories have been entered. In this case, each counter associated with the particular category button that was pressed will increment by the number entered on the number keypad. After pressing the data entry button 10, the microprocessor 22 reads the contents (date, time, and location) of the GPS data buffer 27 of the data-storage component 20—the GPS data buffer 27 containing the latest periodic date, time, and location data sent via the connection to the on-board GPS unit 51—and also reads the contents of the four counters 300. (In an alternate embodiment that uses a LORAN system, the microprocessor 27 will, instead, read the contents of a data buffer that contains the latest periodic data sent to the data-collection-and-storage device 1 via a LORAN connection.) The microprocessor 22 then links the contents of the GPS data buffer 27 (or, of the LORAN data buffer in an alternative embodiment) to those of the four counters 300 and writes the linked data as a single trap data line 33 onto the next line of the trap-haul sub-record 400, whereupon the microprocessor 22 displays a confirmation, such as "Count recorded," on the display area 4 of the display component 19 for a short period of time to allow the confirmation to be seen by the lobsterman 52. The microprocessor 22 then resets the contents of the four counters 300 to zero, displays the zero content of each of the four counters 300 on the display area 4, and, finally, the microprocessor 22 re-enters the idle state 43 and waits for data input or disconnection.

In the Preferred Embodiment, the lobsterman 52 repeats this process of hauling aboard a trap 54, counting the number of each type of lobster in the catch 55 in that trap 54 into the data-collection-and-storage-device 1, entering the count data as a single trap data line 33 line in a trap-haul sub-record, resetting the four counters 300 and returning to the idle state 43, once for each trap 54 of a particular set of traps set in a particular area at sea. Alternatively, the lobsterman 52 hauls several traps aboard, sorts the catch into categories, and then enters the counts for each category, using the number keypad. The internal recording processes of data-collection-and-storage-device remain unchanged when using this method. Also, at any time during the counting of the catch 55 in a particular trap 54, before pressing the data-entry button 10, the lobsterman 52 may press the count reset button 9. Upon detecting that the count reset button 9 has been pressed, the microprocessor 22 resets the contents of the four counters 300 to zero, displays the zero content of each of the four counters 300 on the display area 4 of the display component 19, and re-enters the idle state 43 and waits for data input or disconnection. No data is written in response to this count-reset operation to the data-storage component 20. However, the lobsterman 52 may press the data-entry button 10 when the contents of the four counters 300 are all set to zero. By doing this, the lobsterman 52 writes a single trap data line 33, as described above, to the next line of the current trap-haul sub-record 400 that indicates that the trap 54 just hauled aboard was empty.

When the lobsterman 52 has finished recording the counts of every catch 55 found in every trap 54 of a particular set of traps deployed in a particular fishing location, the lobsterman 52 disconnects the data-collection-and-storage-device 1 from the vessel's power supply outlet 53. In the Preferred Embodiment, when the microprocessor 22 detects such a loss of power—or loss of power for any reason—the microprocessor 22 uses power from the internal battery 24 of the data-collection-and-storage-device 1 to read the time, date, and location data from the GPS data buffer 27 (or, in an alternative embodiment, from the LORAN data buffer) to the next line of the trap-haul sub-record 400 as a power-down/end data line 34. Ideally, the trap-haul sub-record 400 beginning with the power-on/start data line 32 and ending with the power-down/end data line 34 contains all the single trap data lines 33 for one particular set of traps set in one particular fishing location. However, power loss aboard the vessel may serve to break up the ideal trap-haul sub-record 400 into a series of incomplete records. On the other hand, when such fracturing of the ideal trap-haul sub-record 400 occurs, it is likely that the original trap-haul sub-record 400 can be reassembled by reviewing the pieces of fractured trap-haul sub-records 400 for external factors, for example by reviewing the time and location information from a power-down/end data line 34 and the time and location information from the next following power-on/start data line 32. By matching times and locations that are close together, it may be possible to determine momentary power losses. Also, if the data was entered trap-by-trap, rather than by sorted categories, the lobsterman 52 may recognize the number of traps that constitute a particular set of traps in a particular fishing location.

The lobsterman 52 repeats the process of counting the catch and entering count data into the data-collection-and-storage-device 1 for each set of traps set at each separate fishing location. Thus, on its return to port, the catch-record area 26 of the data-storage component 20 holds one or more trap-haul sub-records 400, providing the fisherman over time with information as to profitable catch per fishing location. Upon arrival at port, the lobsterman 52 sells his catch—only the "keepers" he returns with—by the pound, rather than by count.

Figure 6:
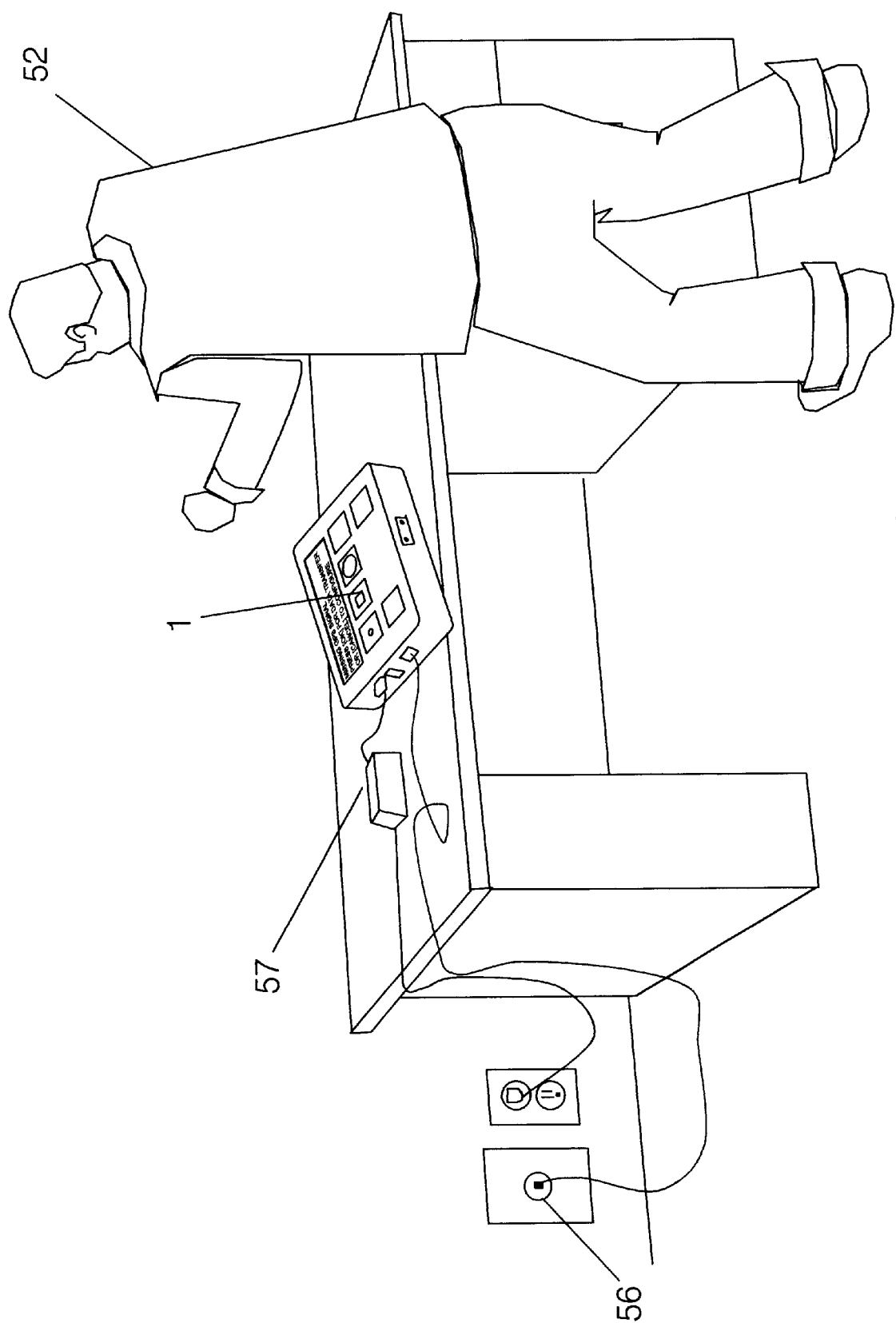
FIG. 6 is a drawing of the data-collection-and-storage-device in use for data transfer to the central processing device.

As illustrated in FIG. 6, the lobsterman 52 links the data-collection-and-storage-device 1 to the central data repository 500 via a telephone system by inserting a telephone plug 56 (not shown) into the telephone connector 12 on the data-collection-and-storage-device 1. In the Preferred Embodiment, the telephone plug 56 is a standard plug and the telephone connector 12 a standard telephone jack. In an alternative embodiment, the lobsterman 52 links the data-collection-and-storage device to a receiving station (not shown). Whether the data-collection-and-storage device 1 is linked to the central data repository 500 or to a receiving station, the procedure for transferring the data is the same for the lobsterman 52. The data-collection-and-storage-device 1 must be connected to an external power source, and disconnected from the navigation system, whether it be the GPS system used in the preferred embodiment, or a LORAN system used in an alternative embodiment. Typically, the telephone connection to the central data repository is made on-shore, from an office, but it can be made from any location that provides access to a telephone system.

Referring to FIG. 3, on power up 41, when the self-test 42 determines that the operator identification data line 31 (FIG. 4) is present and the data-collection-and-storage-device 1 is not connected to a GPS or LORAN system, the lobsterman 52 is prompted to select the operator-data entry mode 800 (in order to modify or update the operator-related record 28) or the data transfer mode 700. In the Preferred Embodiment, if the data transfer mode 700 is selected, the data-collection-and-storage-device 1 checks for the presence of a catch-and-release record 29 in the catch-record area 26 of the data-storage device 20. If the catch-and-release record 29 is not present, the data-collection-and-storage-device 1 returns to the decision prompt 40. If the catch-and-release record 29 is present, prompts appear in the display area 4 of the display component 19 for the lobsterman 52 to enter the number of pounds of lobster brought in and sold (the landed catch), and the dealer to whom the catch was sold. This information is stored in the catch-record area 26 of the data-storage component 20 as the catch-landed data line 35, the last line of the catch-and-release record 29.

In the Preferred Embodiment, the lobsterman 52 initiates the data transfer after the catch-sale data has been entered or, in an alternative embodiment, initiates data transfer of the catch-and-release record 29 without entering sale data. The modem 23, using the telephone number retrieved from the operator-identification data 31, connects the data-collection-and-storage-device 1 to the central data repository 500. As mentioned earlier, in an alternative embodiment the lobsterman 52 may transfer data to a receiving station instead of transferring directly to the central data repository. For the fisherman, the procedure for transferring data from the data-collection-and-storage device 1 to the central data repository 500 or to a receiving station is the same and reference is made in this description only to data transfer from the data-collection-and-storage device 1 to the central data repository 500. It shall be understood that, in an alternative embodiment, data can be transferred, in encrypted form, from the data-collection-and-storage device 1 to a receiving station for temporary holding and then, from the receiving station to the central data repository 500 according to the procedure described below. As soon as the telephone connection is established, the data-collection-and-storage-device 1, responding to signals from the central data repository 500, first sends the device-identification data 30, then sends the lobsterman's identification data retrieved from the operator-identification data 31, and finally proceeds to send, line by line, the catch-and-release record 29. In the Preferred Embodiment, the data is sent to the central data repository 500 using a secure data-encryption technology, such as 64-bit encryption, and a checksum is provided for each line of data for verification. As each line of data is received by the central data repository 500, the verification check is performed. Upon verification, the central data repository 500 signals the data-collection-and-storage-device 1 to send the next line of data;

otherwise the central data repository 500 signals the data-collection-and-storage-device 1 to re-send the same line of data.

Figure 7:
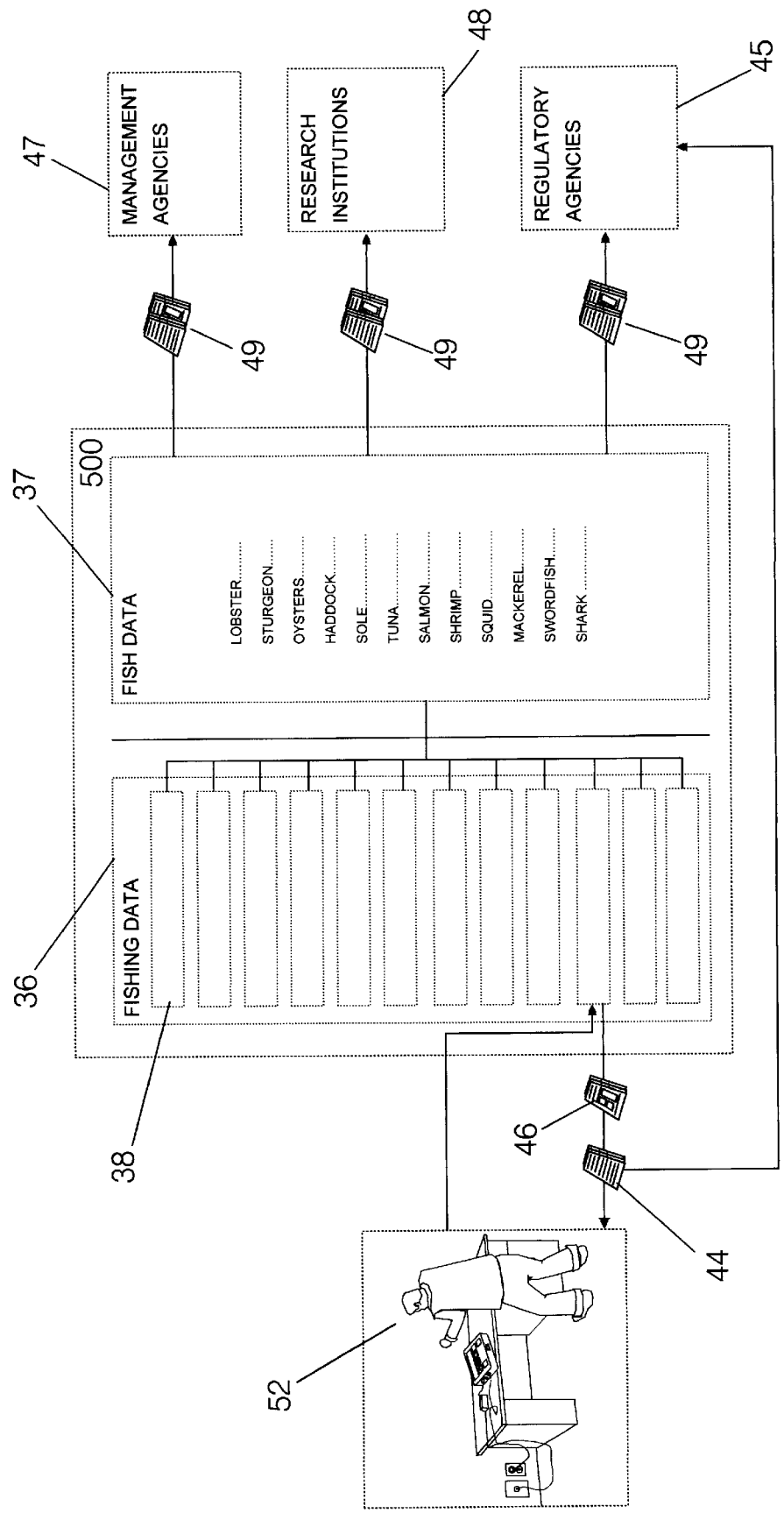
FIG. 7 is a schematic diagram of the internal structure of the central processing device and of the distribution of reports.

As can be seen in FIG. 7, the central data repository 500 is a computer providing for secure storage of data and providing data management software applications to manage and analyze the data. The central data repository 500 of the Preferred Embodiment is divided into two independently secure areas, the fisherman-data area 36 and the aggregate fishery-data area 37. In turn, the fisherman-data area 36 is made up of a number of independently secure fisherman files 38, each fisherman file 38 containing the catch-and-release records 29 of an individual lobsterman 52 or other fisherman. The fishery-data area 37 stores the aggregate data of all fish caught and released by all reporting fishermen. In the Preferred Embodiment, data identifying the individual fisherman has been stripped from the fishery-data; in alternative embodiments, the fisherman identifying data may be included in the aggregate data. The central data repository 500 of the Preferred Embodiment receives data from a large number of individual fishermen whose fishing interests vary and, thus, the fishery-data area 37 contains aggregate data from a large sample of fish (not just lobsters) maintained by species, size, type, condition, and by place and time of recording, along with other reported factors.

In the Preferred Embodiment, when a lobsterman 52 sends a catch-and-release record 29 from the data-collection-and-storage-device 1 to the central data repository 500, the first data items sent are the device-identification data 30 and the operator-identification data 31. These data are used to route the subsequent catch-and-release record 29 only to the fisherman file 38 of the identified lobsterman 52. This file already contains information, registered at the time the lobsterman 52 acquired the data-collection-and-storage device 1, about the lobsterman 52, such as the location and type of business organization, the type and size of the fishing vessel, and the size of the vessel's crew. In the Preferred Embodiment, upon receipt of a catch-and-release record 29 of a particular lobsterman 52, the central data repository 500 immediately generates, and delivers to that lobsterman 52 only, the regulatory reports 44 that the lobsterman 52 is required to file with regulatory agencies 45 to report and certify each catch. Optionally, at the request of the lobsterman 52, the central data repository 500 can simultaneously file the regulatory reports 44 with the appropriate regulatory agencies 45. Thereafter, the central data repository 500 can send to the lobsterman 52 analytical reports 46 based on the accumulated catch-and-release records 29 sent by that lobsterman 52 only. The analytical reports 46, which are deliverable in several formats, including numeric, tabular, and graphical, contain information about landed lobster ("keepers") returned and sold ashore, but also about illegal lobster (undersize, oversize, and breeders) found in the traps 55 and returned to the sea. The analytical reports 46 also contain analysis of lobster population by type (undersize, legal-size, oversize, and breeder), of apparent lobster habitat and possible movement patterns over time, and of trap efficiency per catch over time—a factor generally known as Catch Per Unit Effort (CPUE). In addition, the analytical reports 46 may also contain any data analysis that the lobsterman 52 may request or that the central data repository 500 is capable of providing based on the accumulated catch-and-release records 29 of that particular lobsterman 52.

As the catch-and-release record 29 of the lobsterman 52 is received and stored in a fisherman file 38, fishery-related data 37 is copied to the accumulated fishery-data area 37. In the Preferred Embodiment, the fishery-related data 37 is anonymous data, i.e., data pertaining to species, type, time and place of catch, and count and stripped of data that identifies an individual fisherman as the source of the data. In a first alternative embodiment, the data that identifies an individual fisherman can also be included in the data stored in the fishery-related area 37. Also, access to the data in the central data repository 500 may be restricted to an authorized agency that manages all the data sent to the central data repository 500 and provides reports and data to individual fishermen and to regulatory agencies and institutions as requested and/or required. Over time, a large, statistically valid sample of data about certain marine populations (which can include non-harvested species of marine life as well as the commercially valuable species of shellfish and fish, and other species), species migrations, and fishery conditions is collected in the accumulated fishery-data area 37. Using this data, the central data repository 500 can generate and provide fishery analysis reports 49 to regulatory agencies 45, fishery management agencies 47, and research institutions 48, including numerical, graphical, and mapping data presentations, as the various regulatory agencies 45, fishery management agencies 47, and research institutions 48 may require and benefit from.

It should be understood that the Preferred Embodiment and alternatives thereof mentioned herein are merely illustrative of the present invention. Numerous variations in the use of the present invention may be contemplated in view of the following claims without straying from the intended scope and field of the invention disclosed herein.

I claim:

1. A method for collecting and managing fish-catch data, using a navigational system for determining a longitude/latitude specification of a location of a fishing vessel and an electronic data-collection-and-storage device connectable to said navigational system, wherein said electronic data-collection-and-storage device is constructed so as to facilitate entry of operator-catch data of specific interest to a particular fishing industry, said method comprising the steps of:

a) placing said electronic data collection-and-storage device at a fishing location and coupling said electronic data-collection-and-storage device to said navigational system for determining said longitude/latitude specification so as to acquire directly from said navigational system and automatically store in said electronic data-collection-and-storage device said latitude/longitude specification of said fishing location;

b) entering into said electronic data-collection-and-storage device fish-catch data for a time interval at said fishing location; and c) causing said electronic data-collection-and-storage device to electronically link said fish-catch data with information identifying said time interval and said latitude/longitude specification.

2. The method described in claim 1 wherein said navigational system for determining said longitude/latitude specification is a global positioning system (GPS).

3. The method described in claim 1 wherein said navigational system for determining said longitude/latitude specification is a LORAN radio navigation system.

4. The method described in claim 1 wherein said electronic data-collection-and-storage device is located on board a fishing vessel that travels to a plurality of fishing locations during a single fishing trip and wherein said method further comprises repeating said steps a) through d) at each of said fishing locations.

5. The method described in claim 4 further using a central data repository and a telephone link for transmitting said operator-catch data to said central data repository, said method further comprising the steps of:

d) initializing said electronic data-collection-and-storage device after an initial power-up of said device, said initializing comprising entering identification data into said electronic data-collection-and-storage device, said identification data including an operator ID and a fishing vessel ID; and e) coupling said electronic data-collection-and-storage device to said central data repository by said telephone link and transmitting said operator catch-data to said central data repository, said operator catch-data including said identification data and all said fish-catch data including a time interval and said latitude/longitude specification associated with each instance of said fish-catch data acquired by said electronic data-collection-and-storage device during said single fishing trip.

6. The method described in claim 5, wherein, before coupling said electronic datallection-and-storage device to said central data repository, said method further comprises the step of:

removing said electronic data-collection-and-storage device from said fishing vessel following said single fishing trip.

7. The method described in claim 5 wherein fish-sale data for said single fishing trip is includable in said operator catch-data, said method also comprising the step of entering said fish sale data into said electronic data-collection-and-storage device.

8. The method described in claim 5, also comprising the step of connecting said electronic data-collection-and-storage device to a power source.

9. The method described in claim 5, wherein transmitting said operator catch-data includes transmission of data through said telephone link, and wherein said coupling said device to said central data repository includes a step of linking said electronic data-collection-and-storage device by said telephone link to said central data repository and wherein said transmitting said operator catch-data to said central data repository includes transmitting said data via said telephone link to said central data repository.

10. The method described in claim 5 also comprising the steps of:

(f) encrypting operator catch-data during said transmitting to said central data repository;

(g) storing encrypted operator catch-data in an operator file in said central data repository; and (h) restricting access to said operator file to an operator whose operator ID is said operator ID included in said operator catch-data.

11. The method described in claim 10 also comprising causing said central data repository to generate a fisherman report based on said encrypted operator catch-data.

12. The method described in claim 11, wherein said fisherman report can comport with an information form required by a regulatory agency.

13. The method described in claim 12, wherein said particular fishing industry is a lobster fishing industry, said fishing vessel is a lobster-fishing vessel, said fishing location is a lobster trap location, said fishing trip is a lobster-fishing trip, and said fish-catch data includes lobster-catch data.

14. The method described in claim 10 also comprising the steps of:

(l) creating an aggregate fishery file in said central data repository; and (m) generating fisheries management reports from said aggregate fishery file.

15. The method described in claim 14 further comprising the steps of:

(n) creating anonymous catch-data by removing said identification data and said sale data from said encrypted operator catch-data;

(o) accumulating said anonymous catch-data of each said operator in said aggregate fishery file;

(p) entering fishery-related data from regulatory or research sources in said aggregate fishery file; and (q) generating fisheries management reports based on said anonymous catch-data and fishery-related data from said aggregate fishery file.

16. The method described in claim 5 wherein said telephone link includes a first telephone link and a second telephone link, said method further comprising the steps of:

(i) coupling said electronic data-collection-and-storage device to a receiving station by said first telephone link;

(j) coupling said receiving station to said central data repository by said second telephone link; and (k) transmitting said operator catch-data from said device to said receiving station and subsequently transmitting said operator catch-data from said receiving station to said central data repository.

17. The method described in claim 1, wherein includable in said fish-catch data are data on species, legal size, undersize, illegal species, release back into water, and data on water temperature, water depth, water salinity, water currents, tide phase, and/or weather conditions.

18. The method described in claim 17, wherein said fish-catch data is lobster-catch data and the step of entering into said electronic data-collection-and-storage device fish-catch data further includes the steps of:

(r) entering a count in a catch category or in one of a plurality of non-retained categories for each lobster found in a set of traps hauled up at a lobster trap location, said plurality of non-retained categories including an oversize category, an undersize category, and a V-notched female category; and (s) releasing back into water each said lobster found to belong in one of said non-retained categories.

19. The method described in claim 18, wherein said V-notched female category includes V-notched female lobsters and egg-bearing female lobsters.

20. The method described in claim 1, also comprising the step of connecting said electronic data-collection-and-storage electronic data-collection-and-storage device to a power source.

21. The method described in claim 1, also comprising entering a local time-offset from Universal Time.

22. A method for collecting and managing lobster-catch data using a navigational system for determining a longitude/latitude specification of a location, an electronic data-collection-and-storage device connectable to said navigational system, a telephone link, and a central data repository, wherein said electronic date-collection-and-storage device is constructed so as to facilitate entry of information of specific interest to a lobster fishing industry, said method comprising the steps of:

a) upon an initial power-up of said device, storing identification data in said electronic data-collection-and-storage device, said identification data including an operator ID and a lobster vessel ID;

b) at each of a plurality of lobster-trap locations in a single lobster-fishing trip, placing said electronic data-collection-and-storage device at each said lobster trap location and coupling said electronic data-collection-and-storage device to said navigational system so as to automatically acquire and electronically store a time, a date, and said latitude/longitude specification associated with each said lobster trap location;

c) entering lobster-catch data into said electronic data-collection-and-storage device at each said first lobster trap location by entering a lobster count in a catch category or in one of a plurality of non-retained categories for each lobster found in a set of traps hauled up at said lobster trap location, said plurality of non-retained categories including an oversize category, and undersize category, and a V-notched female category, said V-notched female category including said count of V-notched female lobsters and egg-bearing lobsters;

d) releasing back into water each said lobster found to belong in one of said non-retained categories, e) entering into said electronic data-collection-and-storage device lobster-sale data from a sale of lobster-catch from said single lobster-fishing trip;

f) coupling said electronic datallection-and-storage device to said central data repository via said telephone link and transmitting via said telephone link encrypted operator catch data to said central data repository, said encrypted operator catch-data including said identification data and said lobster catch-data including said time, said date, and said latitude/longitude specification associated with each lobster trap location in said single lobster-fishing trip;

g) storing said encrypted operator catch-data in an operator file in said central data repository and restricting access to said operator file to an operator whose operator ID is said operator ID included in said encrypted operator catch-data;

h) causing said central data repository to generate a fisherman report based on said encrypted operator catch-data;

i) creating an aggregate fishery file in said central data repository;

j) accumulate said encrypted operator catch-data in said aggregate fishery file k) and l) generating resources management reports from said aggregate fishery file.

23. The method as described in claim 22 wherein said navigational system for determining said longitude/latitude specification is a global positioning system (GPS).

24. The method as described in claim 22 wherein said navigational system for determining said longitude/latitude specification is a LORAN radio navigation system.

25. The method as described in claim 22 further comprising the step of creating anonymous catch-data by removing said identification data and said lobster-sale data from said encrypted operator catch-data and wherein said catch-data accumulated in said aggregate fishery file is anonymous catch-data.

26. The method as described in claim 22, wherein said telephone link includes a first telephone link and a second telephone link, said method further comprising the steps of:

(m) coupling said electronic data-collection-and-storage device to a receiving station by said first telephone link;

(n) transmitting said, encrypted operator catch-data to said receiving station via said first, telephone link;

(o) coupling said receiving station to said central data repository by said second telephone link; and (p) transmitting said encrypted operator catch-data from said receiving station to said central data repository via said second telephone means.

* * * * *

UNITED STATES PATENT AND TRADEMARK OFFICE
CERTIFICATE OF CORRECTION

PATENT NO. : 6,567,792 B1
DATED : May 20, 2003
INVENTOR(S) : Richard C. Arnold

It is certified that error appears in the above-identified patent and that said Letters Patent is hereby corrected as shown below:

<u>Title page,</u>
Item [73], Assignee name should read -- Thistle Marine, LLC --

Signed and Sealed this

Twenty-third Day of December, 2003

JAMES E. ROGAN
*Director of the United States Patent and Trademark Office*